March 22, 1927.
T. F. ROBERTS
1,622,208
CONTROL OF AEROPLANES AND THE LIKE
Filed Feb. 11, 1926    3 Sheets-Sheet 1
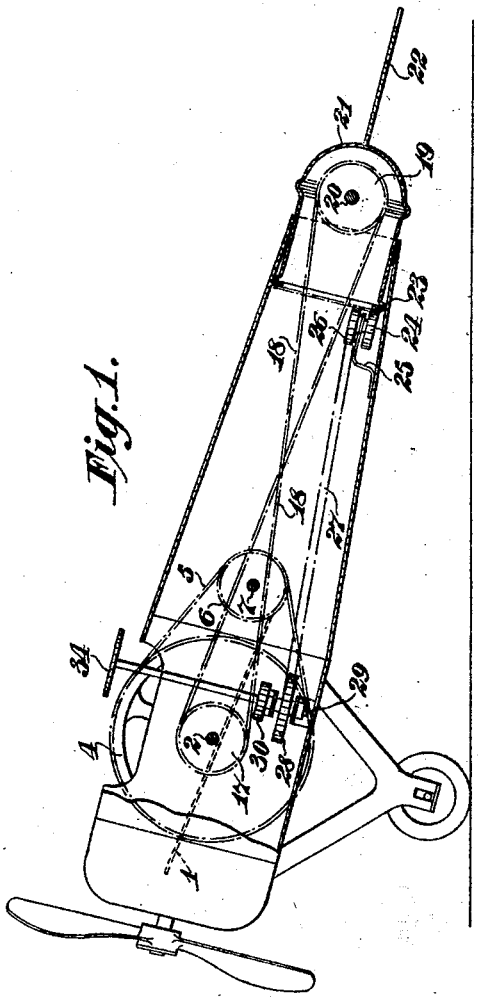
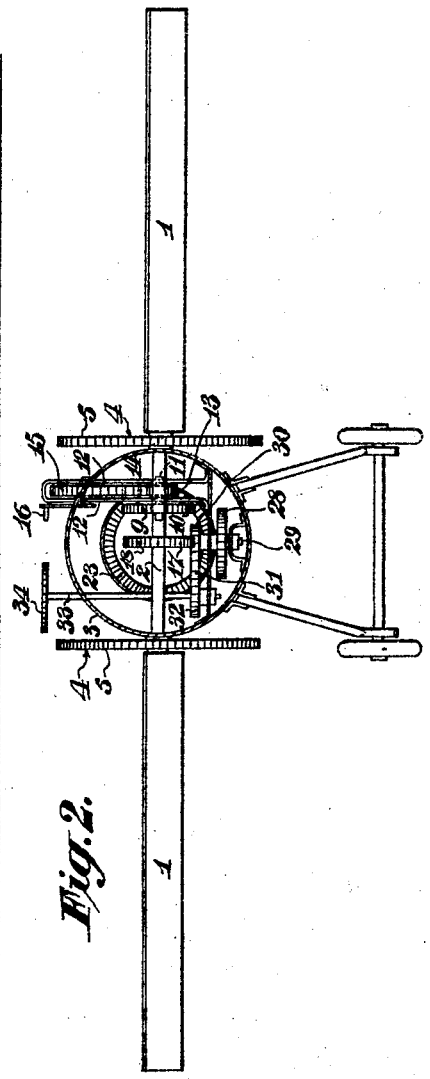
INVENTOR
T. F. ROBERTS

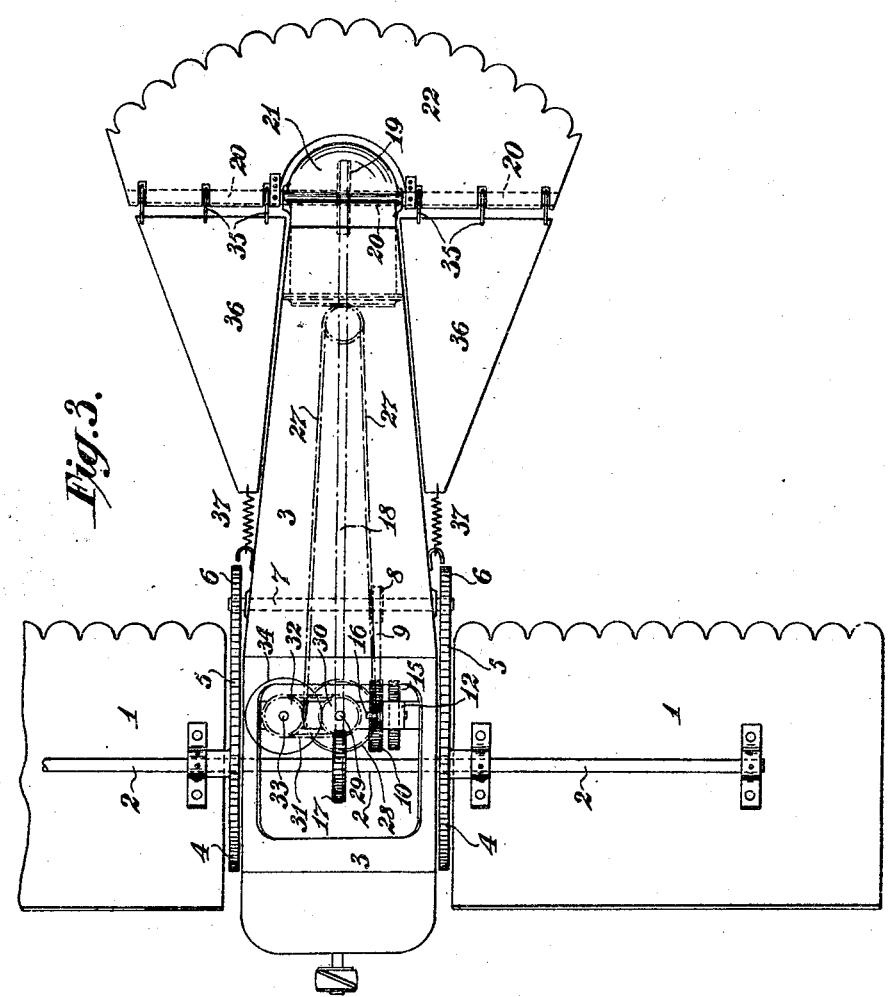

March 22, 1927. 1,622,208
T. F. ROBERTS
CONTROL OF AEROPLANES AND THE LIKE
Filed Feb. 11, 1926     3 Sheets-Sheet 3
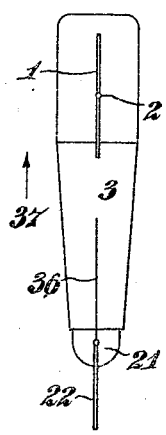
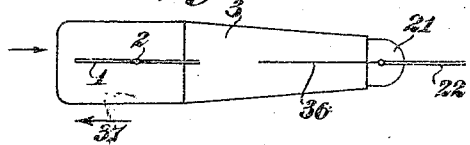
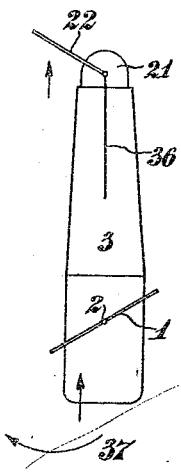
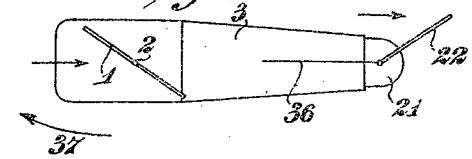
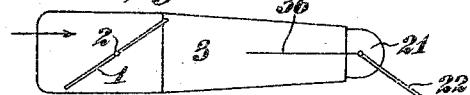
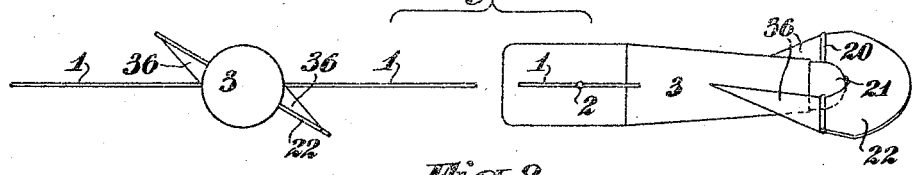
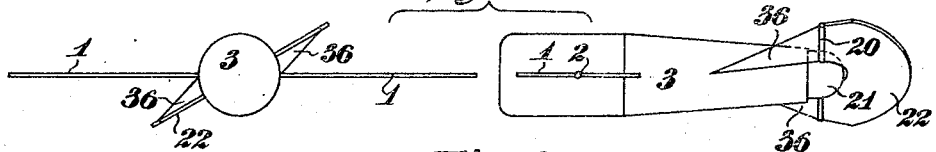
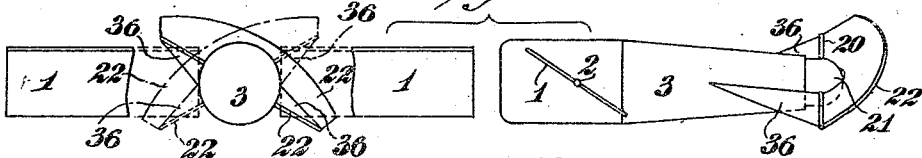
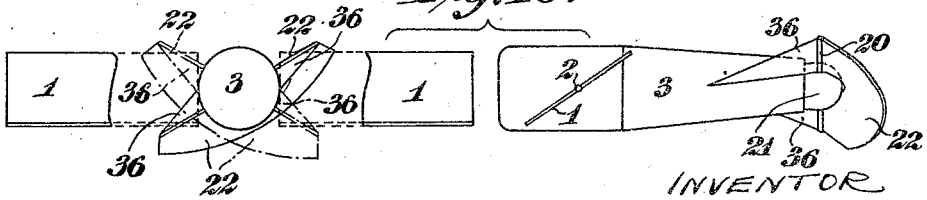
INVENTOR
T. F. ROBERTS Patented Mar. 22, 1927.

1,622,208

UNITED STATES PATENT OFFICE.

THOMAS FREDERICK ROBERTS, OF PECKHAM, LONDON, ENGLAND.

CONTROL OF AEROPLANES AND THE LIKE.

Application filed February 11, 1926, Serial No. 87,720, and in Great Britain February 21, 1925.

This invention of improvements in and relating to the control of aeroplanes and the like has for its object, by the provision of the hereinafter set forth construction, arrangement and working of the wings and tail, to ensure safety while flying and in landing.

Broadly, the invention consists in rotatably mounting the wings, and pivotally and rotatably mounting the tail, which tail is a three-part tail, and interconnecting said wings and tail in such a manner that they can be simultaneously operated to effect, by their inclination, the upward or downward movement of the plane, or the upward or downward movement combined with a turning movement right or left of the plane, or by bringing the wings and tail to a position parallel to the longitudinal axis of the plane, to effect a straight forward movement of the plane with or without a turning movement to right or left, or to turn a sharp downward movement of the plane, i. e. a nose or spiral dive, gradually into an upward movement.

For a clear understanding of the invention, which may be applied to monoplanes, biplanes and gliders, reference is to be had to the following description and the accompanying sheets of drawings illustrative of the invention as applied to a monoplane. Of the drawings:—

Figure 1 is a longitudinal sectional view of the plane.

Figure 2 is a front sectional view.

Figure 3 is a plan view, one of the wings of the plane being partly broken away.

Figures 4 to 12 are diagrammatic views illustrative of various positions which the wings and tail of the plane may assume.

Like numerals of reference indicate corresponding parts in the several figures.

In carrying out the invention, and referring first to Figures 1, 2 and 3 of the drawings, the wings 1 are fixedly mounted on an horizontal and transversely disposed shaft 2, which extends through and is rotatably mounted in the walls of the fuselage 3. Between each wing 1 and the fuselage 3, and fixedly mounted on the shaft 2 aforesaid, is a chain wheel 4 of somewhat large diameter coupled by an endless chain 5 to a chain wheel 6 of smaller diameter carried by an horizontal and transversely disposed shaft 7 which extends through and is rotatably mounted by ball or roller bearings in the walls of the fuselage 3.

On the shaft 7 aforesaid there is fixedly carried another chain wheel 8 which is coupled by an endless chain 9 to chain wheel 10 carried by spindle 11 which is rotatably mounted in a frame 12, said spindle 11 also carrying a chain wheel 13 coupled by endless chain 14 to a chain wheel 15 rotatably mounted in the upper part of the frame 12, and fitted with a crank handle 16 for operation by the left hand of the pilot.

Further, the wing shaft 2 carries another chain wheel 17 coupled by an endless and crossed chain 18 to a chain wheel 19 carried by an horizontally disposed spindle 20 which extends through and is pivotally mounted in the walls of a cap 21 which is rotatably mounted by ball or other bearings in the tail end of the fuselage 3, and to said spindle 20 there is fixedly secured the tail proper 22 of the plane.

The above arrangement of parts is such that according as the pilot rotates the wheel 15 in a clockwise or anti-clockwise direction, so are the wings 1 and tail 22 downwardly or upwardly inclined.

The inner end of the cap 21 is fitted with a vertically disposed toothed ring 23 with which engages a pinion 24 carried by a vertically disposed spindle which is rotatably mounted in a bracket 25 on the inner wall of the fuselage 3, said spindle at its upper end being fitted with a chain wheel 26 which is coupled by endless chain 27 to a chain wheel 28 carried by a rotatable and vertically disposed spindle 29 which at its upper end is fitted with a chain wheel 30 coupled by endless chain 31 to a chain wheel 32 carried by a vertically disposed rotatably mounted spindle 33 which at its upper end is fitted with a hand wheel 34 for operating by the right hand of the pilot.

Connected by means of loops, rings or equivalent devices 35 to the tail shaft 20 are the rear ends of the front parts 36 of the tail, the front ends of the said parts 36 being connected to the sides of the fuselage by springs 37 or equivalent devices to allow of said parts 36 twisting.

The above arrangement of parts is such that according as the pilot turns the hand wheel 34 in clockwise or anti-clockwise direction so is the cap 21, and with it the tail 22—36 turned in relation to the longitudinal axis of the fuselage 3.

Although a transmission by chain wheels and endless chains is set forth and shown in the drawings, yet it is obvious that such transmission may be by means of grooved wheels and endless wire cables, or by any convenient and appropriate arrangement of gear transmission; and, further, a braking device, operable by the aviator, through lever and clutch may be employed to hold the wings stationary when in their desired flying position, leaving the tail free to be used independently of the wings.

Referring to the diagrammatic views shown in Figures 4 to 12. Figure 4 shows the plane travelling in a straight forward horizontal travel, direction arrow 37, the wings 1, tail 22—36 being in longitudinal alignment, but on the pilot operating with his left hand the crank-handled wheel 15 aforesaid in an anti-clockwise direction, the wings 1 and the tail end 22 are then upwardly inclined so that the air striking the undersurface of the wings 1 and the upper surface of the tail end 22, the plane is caused to travel in an upward direction, arrow 37 (see Figure 5), the front part 36 of the tail remaining stationary.

On the pilot turning the crank-handled wheel 15 in reverse direction, the wings 1 and tail end 22 become downwardly inclined, the front part 36 of the tail remaining stationary, so that the air striking the upper surface of the wings 1, and the undersurface of the tail 22, the plane is caused to travel in a downward direction, arrow 37 (see Figure 6).

By keeping the wings 1 horizontal and the pilot turning the hand wheel 34 aforesaid in an anti-clockwise direction, the cap 21 and with it the tail 22—36 is caused to turn, as shown in Figure 7, in a clockwise direction and the plane will be caused to travel horizontally in a circular direction to the right, but if the pilot had turned the hand wheel 34 in a clockwise direction, then the cap 21 and with it the tail 22—36 would have been turned in an anti-clockwise direction, as shown in Figure 8, causing the plane to travel horizontally and in a circular direction to the left.

If, however, the pilot puts the wings 1 and tail end 22 in an upwardly inclined position, and turns the tail 22—36 in a clockwise direction, as shown in full lines in Figure 9, then the plane will travel upwardly and in a direction to the right, but if he turns the tail 22—36 in an anti-clockwise direction, as shown in dot-and-dash lines in said Figure 9, then the plane will travel upwardly in a direction to the left.

But if the pilot downwardly inclines the wings 1 and tail end 22, as in Figure 10, and turns the cap 21 and with it the tail 22—36 in an anti-clockwise direction, then the plane will travel downwardly and in a direction to the left, but if he had turned the tail 22—36 in a clockwise direction, as shown in dot-and-dash lines in said Figure 10, the plane then would travel downwardly and in a direction to the right.

With the above-described arrangement of wings and tail, a nose or spiral dive can be readily prevented by turning or inclining the wings 1 and tail end 22, as shown in Figure 11, so that the air striking the undersurface of the wings 1 and what is now the undersurface of the tail 22, would cause the plane to gradually right itself, forcing the nose of the plane upwardly in a direction to the left, arrow 37, and the tail end of the plane downwardly and to the right, with a sweep, which, by suitably manipulating the wings and tail, may take a vertical upward travel, as shown in Figure 12, dependent upon the lifting power of the engine and propeller.

Crashing, when landing, will be easily prevented by so manipulating the wings and tail that they meet the air and constitute an air brake, so that the plane will finally travel horizontally above the ground and then come to rest thereon without any jar.

I claim:—

In an aeroplane, the combination of a fuselage, transversely mounted tilting wings carried by the fuselage, a tail mounted transversely of the fuselage operable in unison with said wings, means for obtaining a rotary adjustment of said tail axially of said fuselage, and resilient connections between said tail and said fuselage.

In testimony whereof I have affixed my signature hereto, this 27th day of January, 1926.

THOMAS FREDERICK ROBERTS.